A. Duvall,
Ore Washer.

No. 107,169. Patented Sep. 6. 1870.

Witnesses

A. Duvall
Inventor

United States Patent Office.

ALFRED DUVALL, OF BALTIMORE, MARYLAND.

Letters Patent No. 107,169, dated September 6, 1870; antedated August 26, 1870.

IMPROVEMENT IN MACHINES FOR WASHING AND SCREENING ORES AND FERTILIZERS.

The Schedule referred to in these Letters Patent and making part of the same.

*To all whom it may concern:*

Be it known that I, ALFRED DUVALL, of the city and county of Baltimore and State of Maryland, have invented certain Improvements in Machines for Washing and Screening Ores and Fertilizers, &c.; and I do hereby declare that the following is a full, clear, and exact description thereof, reference being had to the annexed drawing making part of this specification, in which—

Figure 1:
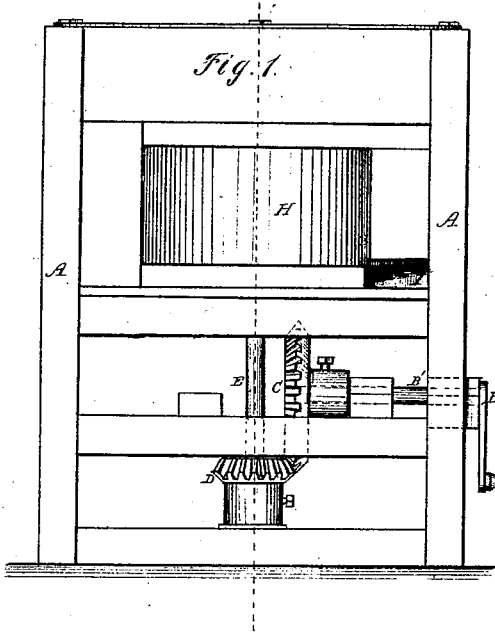
Figure 2:
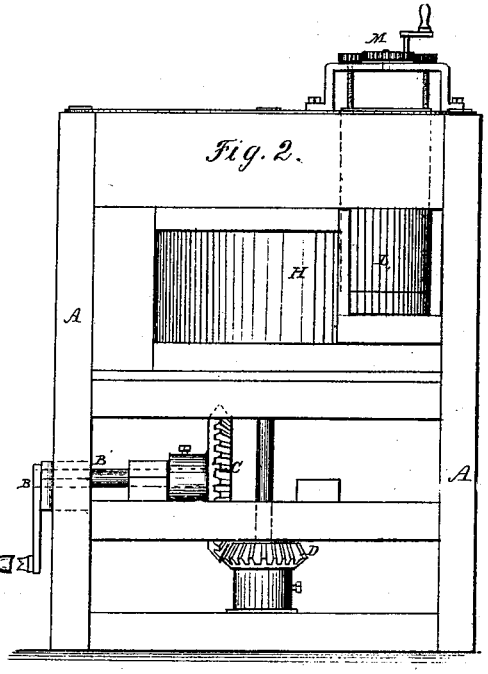
Figure 3:
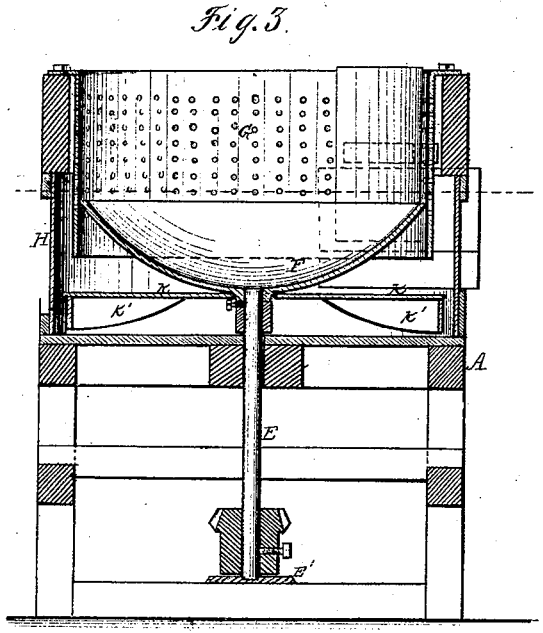
Figure 4:
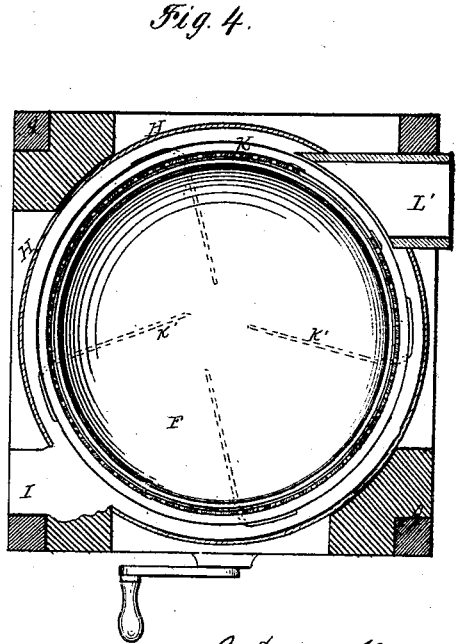

Figure 1 is a side elevation.
Figure 2 is an elevation of the opposite side.
Figure 3 is a vertical section on the line $x\,x$, fig. 1.
Figure 4 is a horizontal section on the line $y\,y$, fig. 3.

The same letters are used in all the figures to indicate identical parts.

My invention relates to a machine for washing and screening various substances, such as ores, phosphates, manures, sand, and gravel, and other analogous uses; and My improvement consists in combining, with a revolving dish on which the substances are rapidly rotated, a perforated screen, surrounding the former, through which the finer particles will pass by the centrifugal action, and in combining with the revolving dish a revolving disk having ribs or fins attached, to carry away the residuum with the water.

The special peculiarities claimed as novel will be set forth hereinafter.

A is a stout frame which supports the mechanism, properly braced and secured so as to sustain the same.

The power is applied at B, in any convenient and usual manner, to give a rotary motion to the horizontal shaft B', turning in suitable boxes on the frame A.

On the end of the shaft B' is a bevel-wheel, C, meshing into the horizontal bevel-pinion D, keyed to the vertical shaft E, which turns upon a step, E', and is supported by suitable bearings on the main frame.

On the upper end of the shaft E is fastened the revolving dish F, made of cast-iron or other suitable material. This I prefer to make concave on its upper surface, but it may be flattened if preferred. This dish carries the material to be operated upon, mingled with water, which is poured in a continuous stream upon it.

A perforated metallic cylinder, G, surrounds and incloses the revolving dish. This cylinder I prefer to make of cast-iron, having numerous holes formed in it, by inserting into the sand in the mold, small iron rods or wires, coated with black lead, clay wash, or other material, to prevent their adherence to the iron when cast, so that, when cast, they may be drawn out, leaving the cylinder with the proper perforations. The cylinder may, however, have the holes drilled or punched, or formed in any other convenient manner.

This perforated cylinder is stationary, and fastened to the frame. It is inclosed by an outside casing, H, to prevent the horizontal discharge of the water about the machine.

The water and finer particles carried with it by the centrifugal action, passing through the perforated cylinder G, flows down between the cylinder G and casing H, and is discharged, through an opening at I, into a trough.

In order to prevent the particles carried with the water from clogging the revolving dish F, I place below it, on the shaft E, a horizontal disk, K, having eccentrically-arranged ribs or fins K' projecting from its lower surface, in the form shown in figs. 3 and 4. These, catching the debris, carry it toward the periphery, to be swept with the water through the opening I into the discharge-trough.

When the materials placed in the revolving dish have, by the centrifugal action, been properly cleaned of their finer impurities, by opening the sliding gate L, they will, as the dish revolves, be, by the centrifugal action, ejected through the opening thus made in the cylinder G, and discharged into the trough L'.

I have shown, in fig. 2, at M, a combination of spur-wheels and screws, designed to be used in operating the gate L, but it is obvious that many other equivalent devices may be substituted for the means here suggested.

The gate may be operated by hand, or it may be connected with the driving-shaft by such suitable intervening mechanism as will cause it to be opened automatically and periodically.

What I claim as my invention, and desire to secure by Letters Patent, is—

1. A machine for washing and screening ores, &c., combining in its construction a rotary dish, F, and perforated cylindrical screen G, substantially as set forth.

2. The combination of the rotary dish F, perforated cylinder G, and ribbed disk K K', substantially as set forth.

3. The combination and arrangement of the rotary dish F, cylindrical screen G, casing H, disk K, and opening I, substantially as set forth.

4. In combination with rotary dish F and perforated cylinder G, a gate, L, substantially as and for the purpose set forth.

In testimony whereof I have signed my name to this specification in the presence of two subscribing witnesses.

ALFRED DUVALL.

Witnesses:
B. EDW. J. EILS,
F. H. SPRAGUE.